United States Patent [19]

Green et al.

[11] Patent Number: 5,403,159
[45] Date of Patent: Apr. 4, 1995

[54] COOLABLE AIRFOIL STRUCTURE

[75] Inventors: Dennis J. Green, Amston; George J. Yamarik, Vernon, both of Conn.

[73] Assignee: United Technoligies Corporation, Hartford, Conn.

[21] Appl. No.: 982,820

[22] Filed: Nov. 30, 1992

[51] Int. Cl.⁶ .............................................. F01D 5/18
[52] U.S. Cl. .................................................. 416/97 R
[58] Field of Search ................... 415/115, 116; 416/95, 416/96 R, 96 A, 97 R

[56] References Cited

U.S. PATENT DOCUMENTS

| | | | |
|---|---|---|---|
| 3,542,486 | 11/1970 | Kercher et al. | 416/97 R |
| 4,278,400 | 7/1981 | Yamarik et al. | 416/97 R |
| 4,474,532 | 10/1984 | Pazder | 416/97 R |
| 4,501,053 | 2/1985 | Craig et al. | 416/97 R |
| 4,753,575 | 6/1988 | Levengood et al. | 416/97 R |

FOREIGN PATENT DOCUMENTS 1033759  6/1966  United Kingdom ............. 416/97 R

OTHER PUBLICATIONS

First Stage Turbine Blade Core for V-2500-A1 engine manufactured by International Aero Engines, in commercial use more than 1 year prior to filing.

*Primary Examiner*—Edward K. Look
*Assistant Examiner*—Christopher Verdier
*Attorney, Agent, or Firm*—Gene D. Fleischhauer

[57] ABSTRACT

A coolable airfoil 10 has a plurality of spanwisely extending passages. Various construction details are developed to increase the cooling effectiveness of the internal structure and decrease the need for cooling air. In one particular embodiment, a leading edge passage 56 has film cooling air flowing over the passage to shelter the passage from the hot working medium gases. This sheltered cooling air is then mixed with heated cooling air from a tortuous passage 84, 92 flowing through the mid-chord region 68 of the blade. In one embodiment, the coating air is supplied to a chordwisely extending tip passage 74 to cool the airfoil tip region and is mixed in the passage 74.

6 Claims, 2 Drawing Sheets

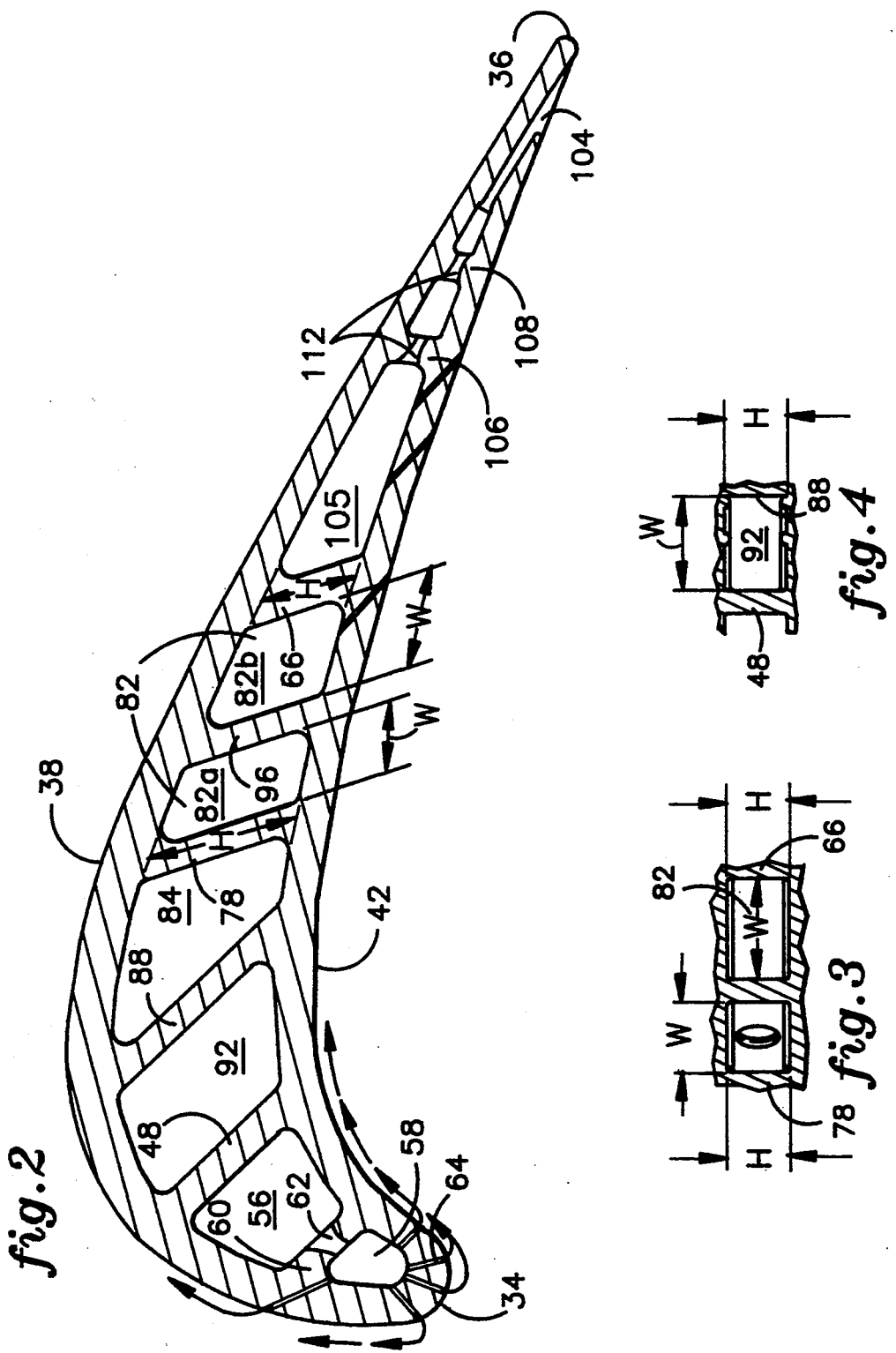

COOLABLE AIRFOIL STRUCTURE

BACKGROUND OF THE INVENTION

1. Technical Field

This invention relates to coolable airfoil structures of the type used in high temperature rotary machines, and more specifically, to structure for providing cooling fluid to a critical location of the airfoil. The concepts disclosed have application to both turbine vanes and turbines blades.

2. Background Art

An axial flow rotary machine, such as a gas turbine engine for an aircraft, includes a compression section, a combustion section and a turbine section. A flow path for hot working medium gases extends axially through the engine. The flow path for hot gases is generally annular in shape.

As working medium gases am flowed along the flow path, the gases are compressed in the compression section causing the temperature and pressure of the gases to rise. The hot, pressurized gases are burned with fuel in the combustion section to add energy to the gases. These gases are expanded through the turbine section to produce useful work and thrust.

The engine has a rotor assembly in the turbine section which is adapted by a rotor disk and blades extending outwardly therefrom to receive energy from the hot working medium gases. The rotor assembly extends to the compression section. The rotor assembly has compressor blades extending outwardly across the working medium flow path. The high-energy working medium gases in the turbine section are expanded through the turbine blades to drive the rotor assembly about its axis of rotation. The compressor blades rotate with the rotor assembly and drive the incoming working medium gases rearwardly, compressing the gases and imparting a swirl velocity to the gases.

Each rotor blade has an airfoil to direct the hot working medium gases through the stage of rotor blades and to receive work from the gases. As a result, the airfoils are bathed in hot working medium gases during operation causing thermal stresses in the airfoils. These thermal stresses affect the structural integrity and fatigue life of the airfoil. In addition, rotational forces acting on the rotor blade as the rotor blade is driven about the axis of rotation further increase the stresses to which the blade is subjected.

Rotor blades are typically cooled to reduce thermal stresses and thereby provide the rotor blade with a satisfactory structural integrity and fatigue life.

An example of such a rotor blade is shown in U.S. Pat. No. 4,474,532 entitled "Coolable Airfoil For a Rotary Machine", issued to Pazder and assigned to the assignee of this application. Another example of a coolable rotor blade is shown in U.S. Pat. No. 4,278,400 issued to Yamarik and Levengood entitled "Coolable Rotor Blade" and assigned to the assignee of this application. Each of these rotor blades is provided with a plurality of cooling air passages on the interior of the blade. Cooling air is flowed through the passages to the rearmost portion of the rotor blade, commonly referred to as the trailing edge, from whence the cooling air is exhausted into the working medium flow path.

The above art notwithstanding, scientists and engineers working under the direction of applicant's assignee are seeking to develop coolable airfoils for use in high temperature rotary machines which have acceptable level of stresses in critical regions of the airfoil.

SUMMARY OF THE INVENTION

According to the present invention, a coolable airfoil having a passage for cooling one end of the airfoil is supplied with cooling air from the other end of the airfoil via two spanwisely extending passages; the first having a tortuous flow path through the mid-chord region where the cooling air gains heat; and, the second having a flow path is sheltered by film cooling air from an adjacent passage to block heating of the cooling air.

In accordance with one detailed embodiment of the invention, a portion of the cooling air flowed in the sheltered passage is passed through an impingement plate and thence impinged against the leading edge region to cool the leading edge region and then it is discharged from the leading edge region to film cool the exterior of the airfoil and shelter the remaining cooling air in the leading edge passage.

In accordance with one detailed embodiment of the invention, the tortuous passage in the mid-chord region of the airfoil has a chordwise width W to rib height between sidewalls H which is less than or equal to 1.0 in the spanwise portion of the passage and less than one and a half in turning passages ($W/H \leq 1.5$) to decrease losses through expansion and contraction of the flow in these turning passages.

A primary feature of the present invention is an airfoil having a tortuous flow passage in the mid-chord region. Another feature is a tip passage in the tip region which is in flow communication with the tortuous passage. Still another feature is a passage in the leading edge region for supplying cooling air to the leading edge region. Another feature is an impingement plate which bounds this passage. Still another feature is film cooling holes which discharge cooling air from the other side of the impingement plate which then flows rearwardly to shelter the cooling air in the first passage. Still another feature is an opening between the first passage and the tip passage for supplying the sheltered cooling air to the tip passage for mixing the sheltered air with air from the tortuous third passage.

A primary advantage of the present invention is the durability of the airfoil for a given mount of cooling air which results from the effectiveness of the cooling air passage in the mid-chord region. Another advantage is the durability of the airfoil for a given mount of cooling air which results from sheltering cooling air flowing to the tip region with air already used for cooling on the interior of the airfoil. Still another advantage is the durability for a given mount of cooling air which results from sizing the turning passages to reduce the pressure loss associated with expansions and contractions of the flow in the turning passage and the deleterious effect such losses have on flow velocity and the rate of convective heat transfer.

Other features and advantages will be apparent from the specification in claims and from the accompanying drawings which illustrate an embodiment of the invention.

BRIEF DESCRIPTION OF DRAWING

FIG. 2 is a cross-sectional view taken along the lines 2—2 of FIG. 1;

FIG. 3 is a simplified cross-sectional view taken along the lines 3—3 of FIG. 1.

FIG. 4 is a simplified cross-sectional view taken along the lines 4—4 of FIG. 1.

BEST MODE FOR CARRYING OUT THE INVENTION

Figure 1:
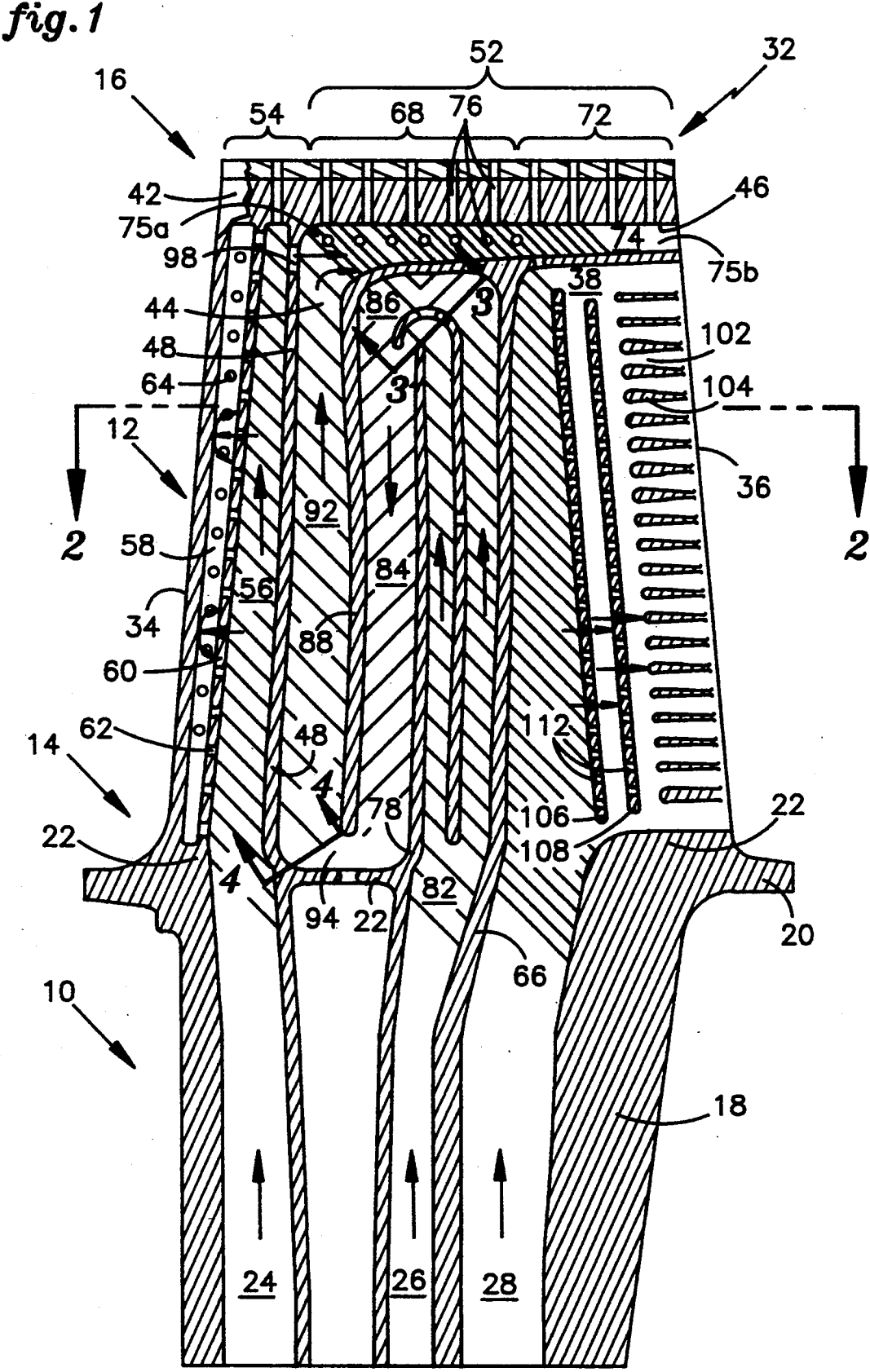
FIG. 1 is a side elevation of a rotor blade partly in section and partly broken away to show the suction sidewall of the rotor blade.

FIG. 1 shows an airfoil structure such as a rotor blade 10, for a rotary machine. The rotor blade has a spanwise reference direction S and chordwise reference direction C. The airfoil structure includes an airfoil section 12 having a first end 14 and a second end 16. As will be realized, the airfoil structure might be a stator vane.

The rotor blade also has a root section 18 and a platform section 20 adjacent to the first end. The platform section is adapted to form a portion of the inner wall of the flow path for working medium gases in a rotary machine. The root section is adapted to engage the rotor of the rotary machine. The root section has a chordwisely extending root wall 22. A first duct 24, a second duct 26, and a third duct 28 are in flow communication with a source of cooling air, such as a compressor (not shown). These ducts extend through the root wall to supply cooling air to the airfoil section.

The airfoil section 12 is adapted to extend outwardly across the working medium flow path and has a tip region 32 at its most outward end. The airfoil section has a leading edge 34 and a trailing edge 36. A suction sidewall 38 and a pressure sidewall 42 (partially broken away in FIG. 1 for clarity and shown in FIG. 2) are joined at the leading edge and the trailing edge. The pressure sidewall is spaced from the suction sidewall to form a cavity 44 therebetween. An internal tip wall 46 extends between the pressure sidewall and the suction sidewall to bound the cavity in the spanwise direction.

Another internal wall, such as a first rib 48, extends in the spanwise direction to the tip wall and is spaced from the leading edge 34 to divide the cavity into a rear portion 52 and a front portion 54. The front portion has at least one passage as represented by the first passage 56. In the embodiment shown, the leading edge has an impingement space 58 disposed adjacent to the first passage. A front rib 60 is disposed in the first passage to bound the impingement space and the first passage. The rib has impingement holes 62 extending therethrough to place the first passage in flow communication with the impingement spaces to provide impingement cooling to the leading edge. A plurality of film cooling holes 64 extend from the interior of the impingement space to the exterior to provide film cooling to the leading edge region of the airfoil.

The rear portion 52 has a second rib 66. The second rib extends in the spanwise direction and is spaced chordwisely from the first rib 48. The second rib divides the rear portion of the cavity into a mid-chord region 68 and a trailing edge region 72. The second rib also extends in the chordwise direction and is spaced spanwisely from the tip wall leaving a tip passage 74 in flow communication with the mid-chord region 68. The tip passage has an upstream end 75a and a downstream end 75b. Cooling air holes 76 in the tip region extend from the tip passage through the tip wall to the exterior.

The rear portion has a third rib 78. The third rib extends in the spanwise direction and outwardly to divide the mid-chord region of the blade into a second passage 82 and a third passage 84. The third passage extends inwardly from the tip region 32 to the root region 18. The second passage extends outwardly from the root region to the tip region. The third rib is spaced spanwisely from the chordwisely extending portion of the second rib 66 leaving a first turning passage 86 therebetween in the tip region of the airfoil which connects the third passage with the second passage.

The rear portion has a fourth rib 88 which extends in the spanwise direction from the tip wall 46. The fourth rib extends from the chordwisely extending portion of the second rib to the root region. The fourth rib bounds the third passage 84. The fourth rib is spaced chordwisely from the first rib 48 leaving an outwardly extending fourth passage 92 therebetween. The fourth passage is in flow communication with the tip passage 74 in the mid-chord region.

The fourth rib 88 is spaced spanwisely from the root wall 22 leaving a second turning passage 94 therebetween. The second turning passage places the fourth passage 92 in flow communication with the third passage 84. Accordingly, the second, third, and fourth passages form a tortuous passage extending outwardly, inwardly and then outwardly through the mid-chord region of the airfoil before finally flowing into the tip passage. The length of the fourth passage in the mid-chord region is at least twice the length of the first passage 56 and in the embodiment shown is about three times the length of the first passage.

In the embodiment shown, a fifth rib 96 is disposed spanwisely in the second passage 82 to form subpassages 82a, 82b. Each subpassage has a chordwise width W to height H ratio (as measured along a sidewall and along a rib between the pressure sidewall and the suction sidewall) which is less than or equal to one ($W/H \leq 1.0$) in the spanwisely extending portion of the passage (as shown in FIG. 1). The fifth rib extends into the first turning passage 86. In the first and second turning passages (as shown in FIG. 3 and FIG. 4) the ratio of width to height in each subpassage is less than or equal to one and one-half of ($W/H \leq 1.5$).

In the tip region 32, an opening 98 extends through the first rib 48 to place the first passage 56 in flow communication with the tip passage 74. This causes mixing of cooling air from the first passage with cooling air from the tortuous passage in the mid-chord region of the blade at the tip passage of the airfoil. The plurality of cooling air holes 76 through the sides of the airfoil and through the tip wall place the tip passage in flow communication with the surface of the airfoil. The tip passage extends to the trailing edge of the airfoil and exhausts cooling air from the airfoil in the trailing edge region.

The trailing edge region has a plurality of slots 102 at the rear of the airfoil. The slots are bounded by teardrop shaped pedestals or lands 104 which extend from the pressure sidewall 42 to the suction sidewall 38. The trailing edge region includes a fifth passage 105 which extends spanwisely. The fifth passage is spaced chordwisely from the slots for ducting cooling air into the trailing edge region from the third duct 28. A pair of spanwisely extending ribs 106, 108 are disposed between the fifth supply passage and the slots. Each has a plurality of impingement 112 holes extending therethrough to direct cooling air against adjacent structure. For example, the holes in the first rib direct cooling air against the second rib. The holes in the second rib direct cooling air against the pedestals after impingement against the pedestals, the cooling air is discharged rearwardly through the slots 102.

FIG. 2 is an airfoil cross section taken along the lines 2—2 of FIG. 1 at approximately the 65% span location of the airfoil. The airfoil section is partially broken away and partly in section for clarity. The cooling air holes 64 extending from the impingement space 58 direct cooling air outwardly and rearwardly as shown by the arrows 86. The suction sidewall 38 and the planar pressure sidewall 42 extend rearwardly. The pressure sidewall is cut away to form a thin trailing edge region 72 of the airfoil.

During operation of the rotary machine, hot working medium gases are flowed over the exterior surface of the airfoil section 12. Heat is transferred from the gases to the suction sidewall 38 and the pressure sidewall 42. Cooling air is flowed to the first duct 24, the second duct 26 and the third duct 28. Approximately one-fourth of the cooling air flowed to the blade is flowed to the first duct 24; one-fourth to the second duct 26, and, one-half to the third duct 28. Cooling air is flowed from the first duct 24 via the first passage 56 in the radially spanwise direction. The cooling air is flowed through the tip holes 76 in the tip of the airfoil. Additional amounts of cooling air are flowed via the impingement holes 62 through the impingement rib. The cooling air is impinged against the leading edge of the airfoil to cool the leading edge. This hotter air, after cooling the leading edge, is prevented from flowing into the first passage by the pressure drop across the impingement plate. Thereafter, the cooling air is collected in the impingement space and is discharged via the tip hole 76 and through film cooling holes 64. From thence, the cooling air is flowed rearwardly over the exterior of the airfoil to block the transfer of heat to cooling air flowing in the first passage 56. As a result, the air in the first passage is relatively cool compared to the air in the impingement passage. The first passage air is much cooler than if it were not film cooled on its way to the tip of the airfoil and this increases the cooling effectiveness of the air.

Cooling air is also flowed outwardly via the tortuous passage 82, 84, 92 which is in flow communication with the second duct 26. As the cooling air passes through the second, third, and fourth passages, the cooling air convectively cools the interior of the airfoil. The tortuous passage effectively increases the heat transfer surface area exposed to the flow in this high heat zone of the airfoil by effectively increasing the length of the passage seen by an element of air.

As the heated air from the tortuous mid-chord passage is flowed into the tip passage, the heated cooling air is mixed with cooling air from the first passage, decreasing the temperature of the mixture. This is important to the tip region because the tip region has very high heat loads receiving heat not only from the sidewalls but also through the tip of the airfoil.

The extra rib (fifth rib) provides additional cold mass for better average metal temperature as well as improving the tip turn geometry. As mentioned, the ratio of width to rib height is less than or equal to one (W/H≦1.0) in the second passage and less than or equal to one and one haft ( W/H≦1.5) in the turning passage. Core passages having a profile of approximately one or less than one have minimal expansion and contraction effects around the turn and minimize the pressure loss in the turn passages. A profile of one and a half to one (W/H≦1.5) is acceptable. It is not as desirable because it has a greater loss than a passage which has a W/H ratio less than one. Minimizing the pressure losses is important to avoid velocity losses which would decrease the convective heat transfer coefficients on the interior of the passage. Naturally, at the trailing edge of the tip region the flow is expanded to increase static pressure and prevent backflow into the interior of the airfoil.

Although this invention has been shown and described with respect to a detailed embodiment thereof, it will be understood by those skilled in this art that various changes in form and detail may be made without departing from the spirit and scope of the claimed invention.

We claim:

1. A coolable rotor blade for an axial flow rotary machine which comprises:
   a root section which adapts the rotor blade to engage a rotor assembly, the root section having a chordwisely extending root wall, a first duct adapted to be in flow communication through the root wall with a source of cooling air, a second duct adapted to be in flow communication through the root wall with a source of cooling air and, a third duct adapted to be in flow communication through the root wall with a source of cooling air;
   an airfoil section having;
      a leading edge,
      a trailing edge,
      a suction sidewall,
      a pressure sidewall joined to the suction sidewall at the leading edge and the trailing edge and spaced from the suction sidewall to form a cavity therebetween,
      a tip region having a wail extending in the chordwise direction between the suction sidewall and the pressure sidewall,
      a first rib which extends in the spanwise direction to the tip wall and is spaced from the leading edge to divide the cavity into a rear portion and a front portion, the front portion having a first passage in flow communication with the first duct,
      a second rib which extends in the spanwise direction and is spaced chordwisely from the first rib to divide the rear portion of the cavity into a mid-chord region and into a trailing edge region which is in flow communication with the third duct, the rib extending in the chordwise direction and being spaced spanwisely from the tip wall leaving a tip passage therebetween in flow communication with the mid-chord region;
      a third rib which extends in the spanwise direction from the rootwall to divide the mid-chord region of the blade into a second passage extending outwardly from the root region to the tip region and a third passage extending inwardly from the tip region to the root region, the third rib being spaced spanwisely from the chordwisely extending portion of the second rib leaving a first turning passage therebetween;
      a fourth rib which extends in the spanwise direction from the chordwisely extending portion of the second rib to the root region, the fourth rib bounding the third passage and being spaced chordwisely from the first rib leaving an outwardly extending fourth passage therebetween, the fourth passage being in flow communication with the tip passage and being spaced spanwisely from the root wall leaving a second turning passage therebetween which places the fourth passage in flow communication with the third passage;

a fifth rib which extends spanwisely in the front portion of the airfoil from the tip wall to the root wall to bound the first passage, the fifth rib being spaced chordwisely from the leading edge to leave an impingement space therebetween, the fifth rib having a plurality of impingement holes extending therethrough to place the first passage in flow communication with the leading edge;

wherein a plurality of film cooling holes extend through the leading edge region from the impingement space to the exterior of the airfoil to cool the airfoil and to block the transfer of heat from the hot working medium gases to the cooling air in the first passage;

wherein the second passage is in flow communication with the second duct to supply cooling air to the second passage and such that the cooling air supplied to the second passage is flowable inwardly through the third passage and outwardly through the fourth passage to the tip passage such that the second, third and fourth passages form a continuous, tortuous passage in the mid-chord region, and, wherein an opening extends through the first rib in the tip region to place the first passage in flow communication with the tip passage to mix the cooling air from the first passage with the cooling air from the tortuous passage in the mid-chord region.

2. The coolable rotor blade of claim 1 wherein a sixth rib is disposed spanwisely in the second passage to form sub-passages having a chordwise width W to height H ratio between sidewalls which is less than or equal to one (W/H $\leq$ 1.0) in the spanwisely extending portion of the passage.

3. The coolable rotor blade of claim 1 wherein a sixth rib extends into the first turning passage to form subpassages such that the ratio of width to height in each subpassage is less than or equal to one and a half (W/H $\leq$ 1.5) in the turning passage.

4. The coolable rotor blade of claim 2 wherein a sixth rib extends into the first turning passage to form subpassages such that the ratio of width to height in each subpassage is less than or equal to one and a half (W/H $\leq$ 1.5) in the turning passage.

5. In a coolable airfoil for a rotary machine of the type having an airfoil section which has a leading edge and a trailing edge, a root section for supplying cooling air to the airfoil section and a tip region in the airfoil section spaced spanwisely from the root section, the tip region having a spanwisely extending tip passage which has an upstream end and which has a downstream end which is in flow communication with the exterior of the blade, the improvement which comprises:

the airfoil section having a suction sidewall and a pressure sidewall bounding a first passage for the cooling air extending outwardly to the tip region, the first passage having a length, an impingement plate spaced spanwisely from the leading edge to leave an impingement space therebetween which extends from the root section to the tip region and which has a length, the impingement plate bounding the first passage and having impingement holes extending therethrough to place the first passage in flow communication with the impingement space and for impinging the cooling air against the leading edge, film cooling holes extending through the airfoil sidewalls to place the impingement space in flow communication with the exterior of the blade to provide film cooling to the first passage, a tortuous passage extending outwardly to the tip region, the tortuous passage being rearwardly of the first passage and having a length which is at least twice as long as the length of the first passage;

wherein the first passage and the tortuous passage are in flow communication with the tip passage for discharging the cooling air into the upstream end of the tip passage, wherein under operative conditions the cooling air from the first passage is at a lower temperature than the cooling air from the tortuous passage to cool the mixture of cooling air in the tip passage, and wherein the entire length of the impingement space is blocked from flow communication with the tip passage to avoid heated air from the impingement space from flowing into the tip passage.

6. The coolable airfoil of claim 5 wherein film cooling holes extend from the tip passage to the exterior of the airfoil section and wherein the downstream end of the tip passage is in flow communication with the trailing edge region of the airfoil section.

* * * * *

UNITED STATES PATENT AND TRADEMARK OFFICE
CERTIFICATE OF CORRECTION

PATENT NO. : 5,403,159

DATED : April 4, 1995

INVENTOR(S) : Dennis J. Green; Edward R. Szela and George J. Yamarik

It is certified that error appears in the above-identified patent and that said Letters Patent is hereby corrected as shown below:

On the title page, item:

"[75] Inventors:" should read as follows:

—Dennis J. Green, Amston, Connecticut; Edward R. Szela, Chicopee, Massachusetts and George J. Yamarik, Vernon, Connecticut.—

Signed and Sealed this

Eleventh Day of July, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,403,159
DATED : April 4, 1995
INVENTOR(S) : Dennis J. Green, et al It is certified that error appears in the above-identified patent and that said Letters Patent is hereby corrected as shown below:

In the Abstract, Line 11, correct "coating air" to --cooling air--.

In Claim 5 at Line 6, please correct "spanwisely extending" to --chordwisely extending--.

In Claim 5 Line 15, please correct "spaced spanwisely" to --spaced chordwisely--.

Signed and Sealed this

Tenth Day of November 1998

*Attest:*

BRUCE LEHMAN

*Attesting Officer*     Commissioner of Patents and Trademarks